United States Patent

Bergquist

[15] 3,648,753
[45] Mar. 14, 1972

[54] SPRAY DRYER AIR FLOW CONTROL

[72] Inventor: Dwight H. Bergquist, Springfield, Mo.

[73] Assignee: Henningsen Foods, Inc., White Plains, N.Y.

[22] Filed: Aug. 13, 1969

[21] Appl. No.: 849,692

[52] U.S. Cl. ..........................159/4, 159/4 F;4 C, 34/227;233
[51] Int. Cl. ..........................................................B01d 1/16
[58] Field of Search..................159/48, 48 L, 4 F, 4 C, 4 E, 159/4 B; 34/146, 233, 116–118, 227

[56] References Cited

UNITED STATES PATENTS

| 2,363,281 | 11/1944 | Arnold | 34/10 |
| 502,237 | 7/1893 | Proctor | 34/196 X |
| 2,576,264 | 11/1951 | Coulter et al. | 159/4 F |
| 2,851,097 | 9/1958 | Ledgett | 159/4 R |
| 2,893,871 | 7/1959 | Griffin | 99/56 |
| 3,113,062 | 12/1963 | Darnell | 159/4 S |
| 3,415,665 | 12/1968 | Hussmann | 159/48 |

Primary Examiner—Norman Yudkoff
Assistant Examiner—J. Sofer
Attorney—Norman N. Holland

[57] ABSTRACT

An apparatus and method for providing a uniform cross-sectional air flow for the drying chambers of tunnel-type tray and spray dryers and the freezing chambers of blast freezers by placing guide members having air directing orifices positioned over their surfaces adjacent to the air inlets and outlets of said chambers. Means are provided to introduce the material to be treated and a stream of heated air into the chambers.

2 Claims, 8 Drawing Figures

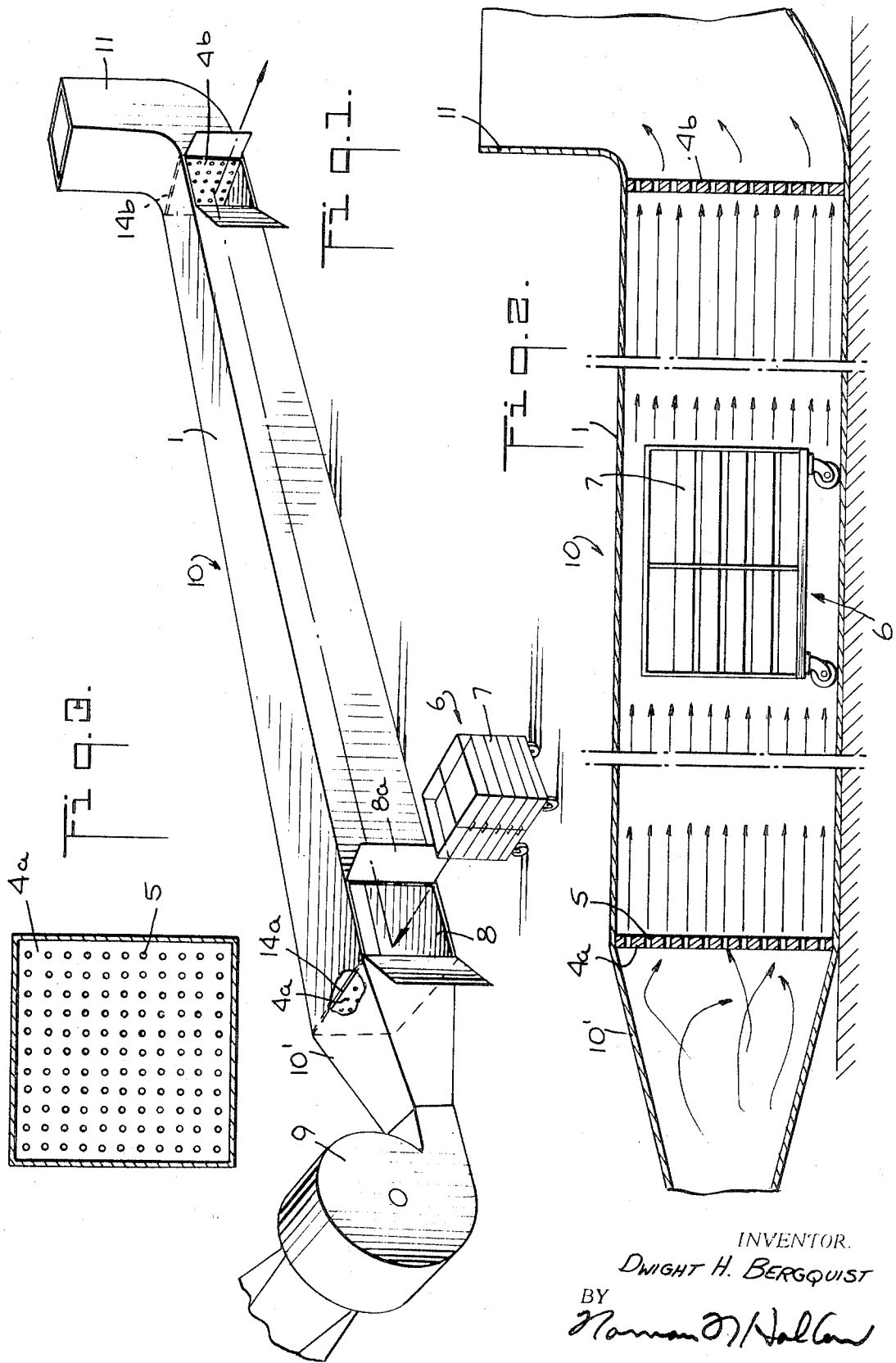

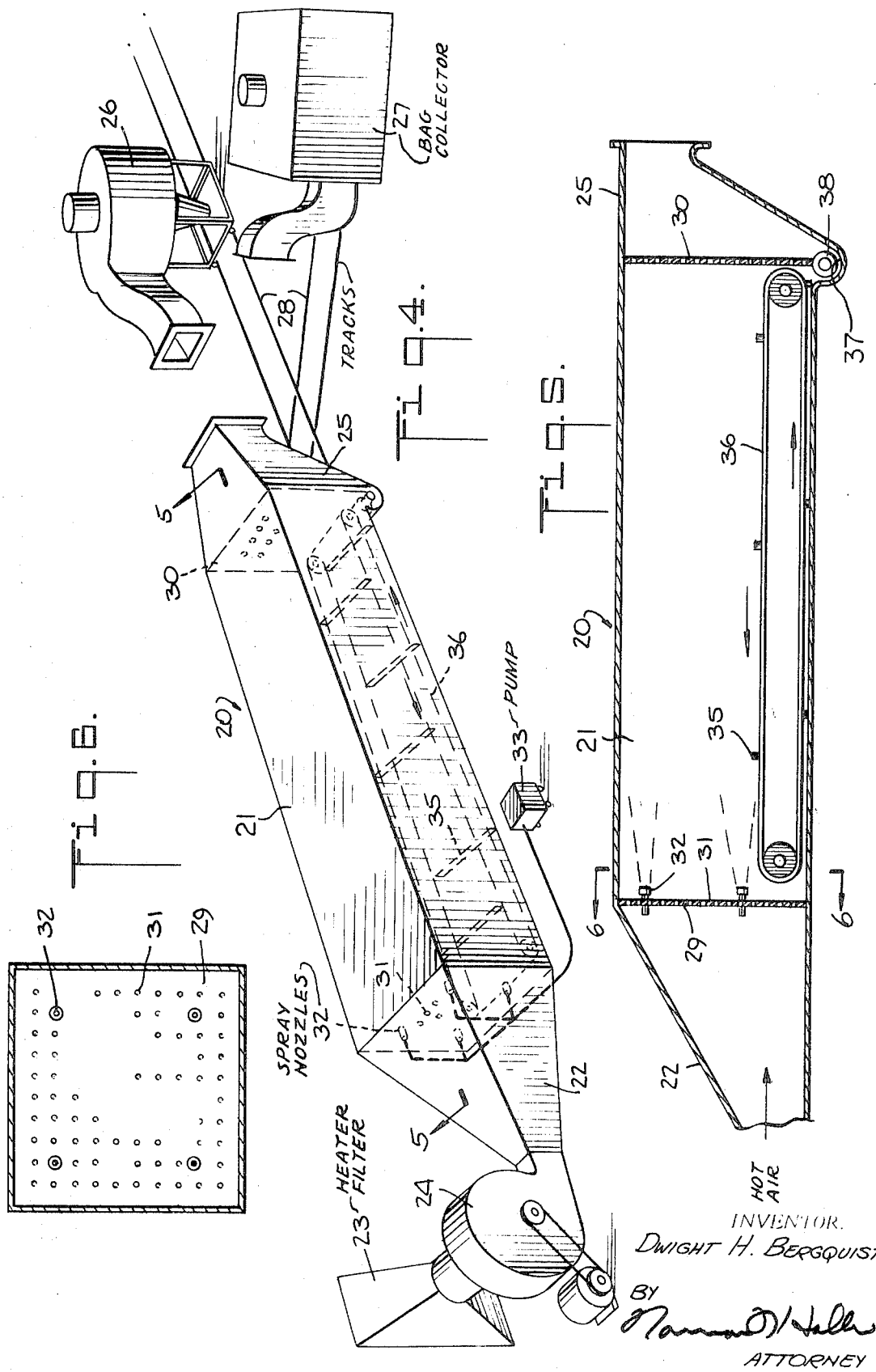

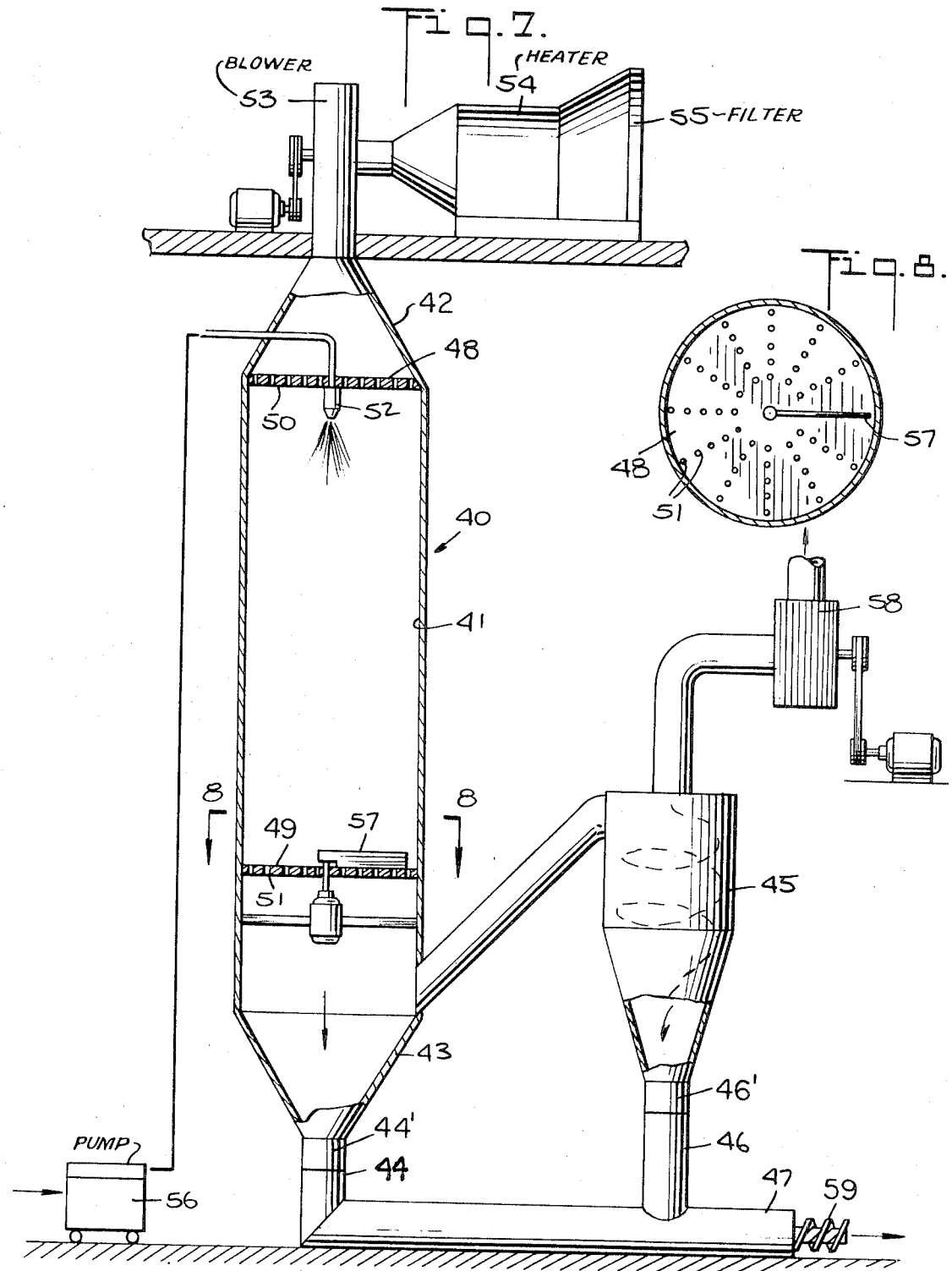

SPRAY DRYER AIR FLOW CONTROL

BACKGROUND OF THE INVENTION

Uniform cross-sectional air flow has been difficult to achieve in tunnel-type tray dryers, spray dryers, and blast freezers. Air flow has been found to be non-uniform in the article treating chambers of these pieces of equipment, and this has created many problems as discussed below. The purpose of this invention is to provide a method and apparatus for obtaining uniform cross-sectional air flow through an article drying or freezing chamber. The term "article treating chamber" is used to cover the drying and freezing chambers mentioned above.

In tunnel-type tray dryers, non-uniform air flow results in over-drying of some materials and under-drying of other materials depending on their location in the tunnel. In order to dry the material that is in the low air flow region, drying times have to be extended or temperatures have to be increased to remove moisture from the slowest drying materials. Material in the high air flow regions then becomes over-dried and overheated. Uniform cross-sectional air flow minimizes heat exposure and drying time by allowing all of the material to dry at the same rate regardless of its location in the cross section of the tunnel.

In the spray dryers, air flow is usually very complex and non-uniform. There are many different designs for spray drying equipment, but none of the prior designs provide suitably uniform cross-sectional air flow through the drying chamber. Non-uniform air flow and eddy currents resulting from an abrupt entrance of the drying air into and exit from the drying chambers give differences in drying conditions at different locations and also cause depositing of material on the walls of the chamber. Here again, drying conditions have to be adjusted to fully dry the particles in the zones of the poorest drying conditions at the risk of heat damage to particles in other zones. Thus, in the improved method and means, drying temperatures can be at a minimum and heat sensitive products can be dried with a minimum risk of damage to their desirable functional and chemical properties. Because the air flow is uniform, there is also little or no build-up of product on the chamber walls.

The advantage of uniform cross-sectional air flow can also be demonstrated in other equipment, such as in blast freezers. Here uniform cross-sectional air flow through the freezing chamber results in a uniform freezing of all materials placed in the air stream.

DESCRIPTION OF THE INVENTION

Uniform cross-sectional air flow insures that the velocity of air moving through a chamber is substantially the same at any point in the chamber cross section except for areas immediately at the surfaces of the walls, floors and ceilings. Uniform cross-sectional air flow is achieved by using flow directing plates through which there is a substantial air pressure drop. This orifice plate or member is placed at both the inlet cross section and outlet cross section of the chamber through which the air flows in order to achieve maximum uniformity in the cross-sectional flow through the entire length of the chamber. The orifice plates preferably cover the entire cross section of the inlets and outlets of the chambers and the orifices are preferably spaced uniformly throughout the plate.

The cross-sectional shape of the chamber may be either square, rectangular, circular or oval. The cross-sectional area and shape should be the same throughout the entire length of the chamber.

A preferred embodiment of the present invention has been chosen for purposes of illustration and is shown in the drawings wherein:

FIG. 1 is a partially cut away perspective view of the invention as used in a tunnel-type tray dryer;

FIG. 2 is a fragmentary sectional view of FIG. 1 showing a rack of articles being tray dried;

FIG. 3 is a front view of an orificed air plate that is positioned at the inlet and outlet of the drying or freezing chamber;

FIG. 4 is a perspective view of another embodiment illustrating a spray dryer;

FIG. 5 is a vertical sectional view of the dryer of FIG. 4 taken along line 5—5 on FIG. 4;

FIG. 6 is a sectional view of the dryer taken along line 6—6 on FIG. 5;

FIG. 7 is a side elevational view partially in section of another embodiment of a spray dryer having a vertical drying chamber; and FIG. 8 is a horizontal sectional view taken along line 8—8 on FIG. 7.

The invention may be used in conjunction with the tunnel-type tray dryer 10 such as illustrated in FIGS. 1 and 2 of the drawings. The dryer 10 consists of a drying chamber 1 having an air inlet 14a at one end an air outlet 14b at the other. The inlet 14a and the outlet 14b are covered by plates 4a and 4b, respectively, having a plurality of orifices 5 therein proportioned and spaced as described above. FIG. 3 is a view of a preferred form of the plates in greater detail. It can be seen that the plate comprises a relatively flat member having a large number of apertures or orifices 5 uniformly spaced throughout. Plate 4a completely covers the inlet 14a and plate 4b covers the outlet 14b of the drying chamber 1. Racks 6 containing material on trays 7 are introduced into the drying chamber 1 through a suitable inlet 8 closed by a door or covering 8a after the rack 6 is introduced. The trays 7 are conveniently arranged in horizontal layers and 3-inch separation between the trays 7 has been found to be satisfactory. The heated air is moved through the system by a blower 9 and flared entry 10'. The air is exhausted through outlet 11. It has been found that the velocity of the air flow is uniform through the chamber 1 cross section.

In commercial size dryers where the drying chamber is several feet in diameter and several times as long as it is wide, a satisfactory orifice pattern comprises holes of from about one quarter inch to about one inch in diameter and spaced on centers about three hole radii apart.

A desired uniform air flow exists between such orifice plates when the overall air pressure drop through the chamber including the two orifice plates is greater than about 1 inch water so that the pressure drop across each orifice plate is greater than about 0.5 inch water.

Pressure drops of this amount may be obtained with orifice or air flow control plates having smaller orifices than those described above, such as screen-like plates where the ratio of the apertured area to the solid area is arranged to give the desired uniform air pressure drops in the flow of drying air.

This invention has also been found to be particularly useful in another embodiment where the drying operation is performed by spray drying. FIGS. 4, 5 and 6 illustrate a preferred embodiment of this system. The dryer 20 includes an elongated drying chamber 21 having its flared inlet 22 connected to a source 23 of hot and filtered air including a blower 24. The chamber 21 includes a tapered outlet 25 for the dried material which is alternatively coupled to either a cyclone collector 26 or to a bag collector 27. The cyclone collector 26, of the type commercially available for collecting powdered material, may be used for most products. In certain situations where almost no product loss can be tolerated or where extremely minute particles are being processed, a more efficient bag-type air filter collector may be used. Tracks 28 are illustrated over which the alternative collector means may be moved into position and coupled to the dryer tunnel outlet 25.

An extremely uniform laminar flow of the hot drying air through the drying chamber is obtained in the preferred embodiment through the use of orifice plates 29 and 30 of the chamber inlet and outlet 22 and 25, respectively. These plates 29 and 30 are generally similar to those described above in connection with the tunnel dryer. The plates 29 and 30, therefore, include a relatively larger number of air passages or orifices 31 which have been found to provide for the vastly improved control of the air flow.

The product to be dried is fed into the chamber 21 through spray nozzles 32 and preferably by an array of two or more nozzles 32 mounted in spaced position beyond the inlet orifice plate 22. These nozzles 32 are conventional atomizing nozzles for spraying the liquid product to be dried into the hot air stream. The nozzle array illustrated has four separate nozzle 32 spaced in a symmetrical pattern with each of the nozzle 32 being positioned adjacent to a corner of the inlet orifice plate 29. The nozzles 32 are shown connected to a convenient source of the liquid being dried through a pump 33. It has been found that the laminar flow of the drying air provides for a significantly improved evaporative efficiency which permits the product to be thoroughly dried in a shorter time and at a uniform and lower chamber temperature since no cool areas have to be compensated for. This also provides for a reduction in the B.t.u. demand for air heating thereby saving fuel. The drying chambers in a tunnel of the type illustrated, for example, for typical powdered egg products, may be in the neighborhood of 130° F. where the outlet stream has a relative humidity in the neighborhood of 30 percent. To produce this tunnel temperature a typical air input temperature in advance of the spray nozzles 32 will be about 320° F. since the spraying cools the air at this zone.

As the sprayed product dries in the chamber 21, it falls to the chamber 21 bottom. A belt-type drag is illustrated having drag bars 35 connected at their ends to endless side drive belts or chains 36 so that bars 35 continuously remove the dried product from the drying chamber 21. Drag bars 35 carry the product into a well 37 which accommodates a helicoil 38 for removing the dried product from the dryer.

The orifice plate controlled laminar drying air flow which provides the improved results, already described above, is also useful in another form of dryer having a vertical drying chamber. This improvement of the invention is illustrated in FIGS. 7 and 8. In this dryer 40, a generally cylindrical vertical drying chamber 41 is mounted between a conical hot air inlet 42 at the top of the chamber 41 and a conical product outlet 43 at the bottom of the chamber 41. The dried product in this embodiment passes through a discharge outlet 44 including an air lock 44' while the exhaust air is passed through a suitable cyclone separator 45 and exhaust blower 58 mounted adjacent to the chamber 41 and including a product outlet 46 also having an air lock 46' which adds the dried powder separated at that point to the product being fed by an auger 59 to the main outlet 47. This dryer also includes inlet and outlet orifice plates 48 and 49, respectively, including a series of spaced orifices 50 and 51 for causing the drying air to flow in its preferred uniform or laminar flow pattern. The circular cross section of the tunnel illustrated is found to operate efficiently with a single product spray nozzle 52 although other nozzle patterns may be used. The hot drying air is fed through a blower 53 from a heater 54 and filter 55 and the liquid product which is being dried is pumped from a product source by a liquid pump 56 coupled to the spraying nozzle 52. This dryer utilizes gravity force to facilitate product movement and collection and includes a rotary wiper 57 to insure the passage of the dried powder through the lower orifice.

It can be seen from the foregoing that the improved air control of this invention allows tunnel and chamber types of dryers and blast freezers to operate more efficiently by providing for uniform cross-sectional air flow throughout the drying chambers. The uniform air flow insures an even heating and drying of product regardless of its cross-sectional position in the chamber, thereby permitting even and lower drying temperatures and providing a better product and fuel savings.

As various changes may be made in the form, construction and arrangement of the parts herein and the particular methods described without departing from the spirit and scope of the invention and without sacrificing any of its advantages, it is to be understood that all matter herein is to be interpreted as illustrative and not in a limiting sense.

Having thus described my invention, I claim:

1. In an improved spray drying chamber having an elongated horizontal drying chamber extending between an air inlet and an air outlet and having a plurality of spray nozzles beyond said air inlet and a drag means on the chamber floor for removing dried powder in advance of said air outlet the improvement comprising a first air flow controlling plate positioned in the air path intermediate said air inlet and said nozzles, a second air flow controlling plate positioned in the air path between said drag means and said air outlet, and said first and second plates having uniformly spaced orifices throughout for causing a uniform air flow throughout the cross sections of said chamber and providing a low air pressure drop along said chamber as compared with the air pressure drop across said plates.

2. In an improved spray drying chamber having a generally vertical drying chamber extending between an upper air inlet and a lower air outlet and having a downwardly directed spray nozzle axially positioned below said air inlet for concurrent flow of air and sprayed liquid, the improvement comprising a first air flow controlling plate positioned traversely across air path intermediate said air inlet and said nozzle, a second air flow controlling plate positioned traversely across the air path above said air outlet, and said first and second plates having uniformly spaced orifices throughout for causing a uniform air flow throughout the cross sections of said chamber and providing a low air pressure drop along said chamber as compared with the air pressure drop across said plates.

* * * * *